(12) United States Patent
Liebenow

(10) Patent No.: US 6,816,913 B1
(45) Date of Patent: Nov. 9, 2004

(54) CONVENIENT SYSTEM, METHOD, AND SOFTWARE FOR ONLINE COMPUTER USERS TO SUMMON OFFLINE COMPUTER USERS

(75) Inventor: Frank W. Liebenow, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 680 days.

(21) Appl. No.: 09/185,924

(22) Filed: Nov. 4, 1998

(51) Int. Cl.⁷ .......................................... G06F 15/173
(52) U.S. Cl. ..................................... 709/239; 709/240
(58) Field of Search ................................ 709/239, 240, 709/241, 242, 218, 220; 714/4

(56) References Cited

U.S. PATENT DOCUMENTS

| | | | | |
|---|---|---|---|---|
| 4,930,151 A | * | 5/1990 | Walton et al. ................. 379/94 |
| 5,023,873 A | * | 6/1991 | Stevenson et al. ............ 371/8.2 |
| 5,426,426 A | | 6/1995 | Hymel ......................... 340/825 |
| 5,426,773 A | * | 6/1995 | Chabanet et al. ............ 395/575 |
| 5,428,663 A | * | 6/1995 | Grimes et al. ................ 379/57 |
| 5,487,100 A | | 1/1996 | Kane ............................ 379/57 |
| 5,489,894 A | * | 2/1996 | Murray ................... 340/825.44 |
| 5,493,692 A | | 2/1996 | Theimer et al. ............ 455/26.1 |
| 5,510,778 A | | 4/1996 | Krieter et al. .......... 340/825.44 |
| 5,581,543 A | * | 12/1996 | Natarajan .................... 370/221 |
| 5,592,531 A | | 1/1997 | Cheng et al. .................. 379/57 |
| 5,611,055 A | | 3/1997 | Krishan et al. .............. 395/281 |
| 5,640,153 A | | 6/1997 | Hildebrand et al. ... 340/825.06 |
| 5,802,258 A | * | 9/1998 | Chen ...................... 395/182.08 |
| 5,878,209 A | * | 3/1999 | Manssen ................... 395/185.1 |
| 5,884,159 A | * | 3/1999 | Thro et al. ................... 455/412 |
| 6,014,549 A | * | 1/2000 | Foladare et al. ........... 455/31.3 |
| 6,038,212 A | * | 3/2000 | Galand et al. .............. 370/216 |

FOREIGN PATENT DOCUMENTS

EP 0847174 12/1996 ............ H04M/3/00

* cited by examiner

Primary Examiner—Zarni Maung
(74) Attorney, Agent, or Firm—Scott Charles Richardson; Eduardo Drake; Schwegman, Lundberg, Woessner & Kluth, P.A.

(57) ABSTRACT

Computers are commonly connected in networks which allow interactive communications between two or more computer users. Occasionally, one user tries unsuccessfully to interactively communicate with another user who is unavailable for interactive communications. Accordingly, the inventor devised a system, method, and software to summon the unavailable user through an alternative communications device, for example, a pager, associated with the unavailable user.

16 Claims, 3 Drawing Sheets

CONVENIENT SYSTEM, METHOD, AND SOFTWARE FOR ONLINE COMPUTER USERS TO SUMMON OFFLINE COMPUTER USERS

FIELD OF THE INVENTION

The present invention pertains to computer systems and communication networks, particularly networked computer systems that enable interactive communications between two or more computer systems.

BACKGROUND OF THE INVENTION

Computers, particularly personal computers, are well on there way to becoming as ubiquitous as televisions and telephones. The ascendency of computers from relative obscurity to commonness has been fueled by their utility as everyday communications devices. This utility stems largely from the fantastic, compounded growth of computer networks, particularly the much heralded Internet.

The Internet, a worldwide network of computers interconnected through private wiring systems and public telephone systems, functions as a planetary communications system for sending and receiving information from one computer to one or more other computers. A seminal example of Internet-based communications is electronic mail, more commonly known as e-mail. E-mail, an electronic analog to centuries-old parcel-based mail systems, entails creating a message and sending it electronically to a recipient by specifying her computer address. The message, which may include text, audio, and video information, waits in an electronic mailbox to be accessed at the recipient's convenience without further action by the sender.

The Internet also supports interactive communications, such as conversations, between two or more computer users or computer systems. Interactive communications also encompass videoconferencing as well as multi-player games with many players interacting on a common gameboard or playing field or within an artificial environment. However, regardless of the particular manifestation, interactive communications between two users requires that each user, more precisely each user's computer system, be connected to the other user's computer system. In network parlance, this means each user must be online.

Unfortunately, it is fairly common that when one user tries to converse, play, or otherwise interact with another user over a network, such as the Internet or the Public Shared Telephone Network via point-to-point protocol, the other user is not online, foiling the desired interaction. When this happens, the one user has several inconvenient options, including trying the interaction later or manually telephoning the user at his home or office. However, if the other user is away from his computer or telephone, none of these options is very helpful.

SUMMARY OF THE INVENTION

To address these and other shortcomings, the inventor has devised a system, method, and software that enable online users to conveniently notify offline users of their desire to interact. Specifically, one embodiment determines that a particular user or computer system is offline or otherwise unavailable, searches a database listing other communications devices associated with that user or computer system, and then automatically tries to transmit a message to another communications device, for example, a wireless pager, associated with the offline user or computer system. The message, in some embodiments, identifies the network address of the computer user seeking an online interaction as well as the type of interaction, for example, an online conversation or multi-player game.

Other embodiments, aspects and advantages of the invention will become apparent in view of the accompanying drawings and the following detailed description.

DETAILED DESCRIPTION OF PREFERRED EMBODIMENTS

Figure 1:
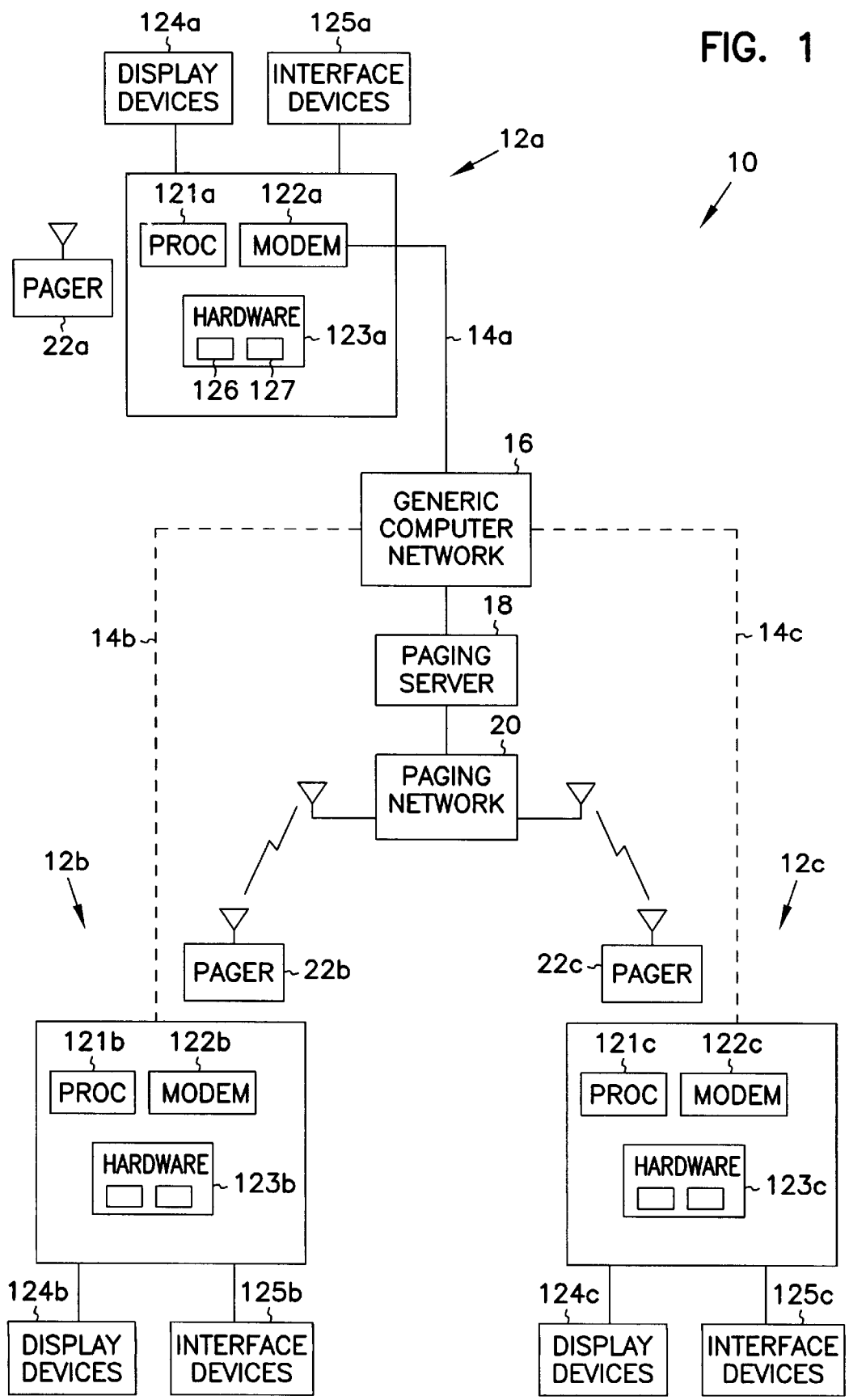
FIG. 1 is a diagram of a system incorporating the invention.
Figure 2:
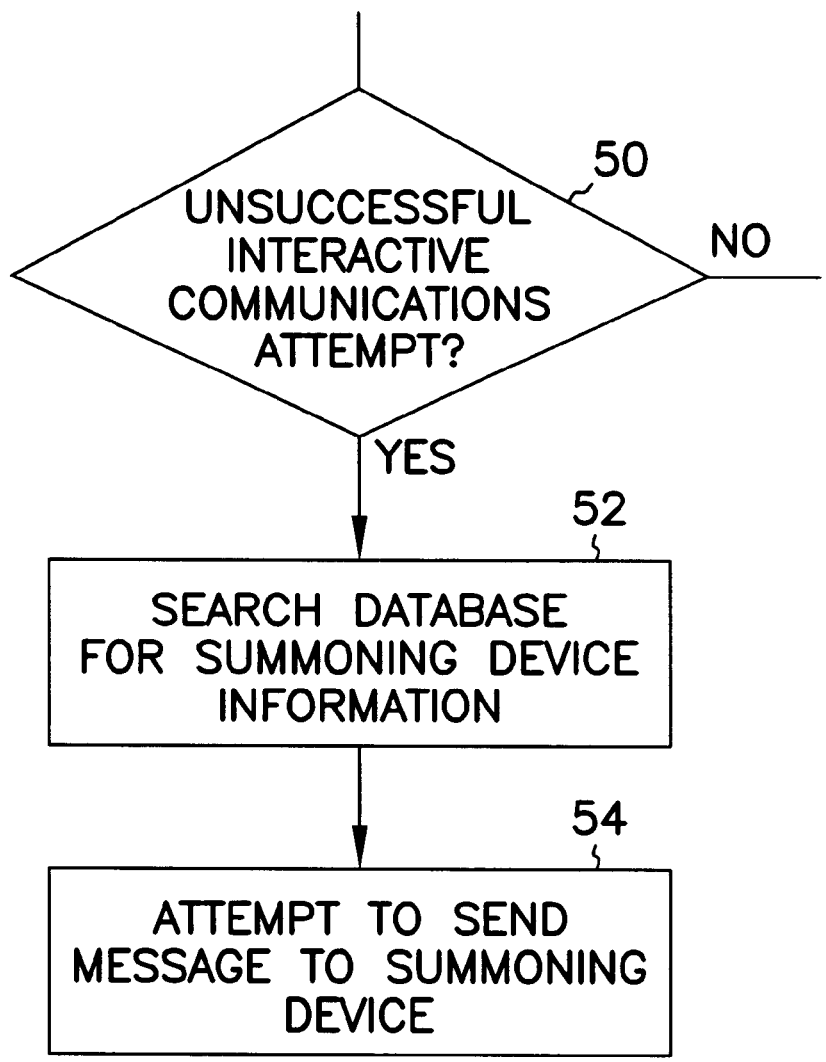
FIG. 2 is a flowchart of a method incorporating the invention.
Figure 3:
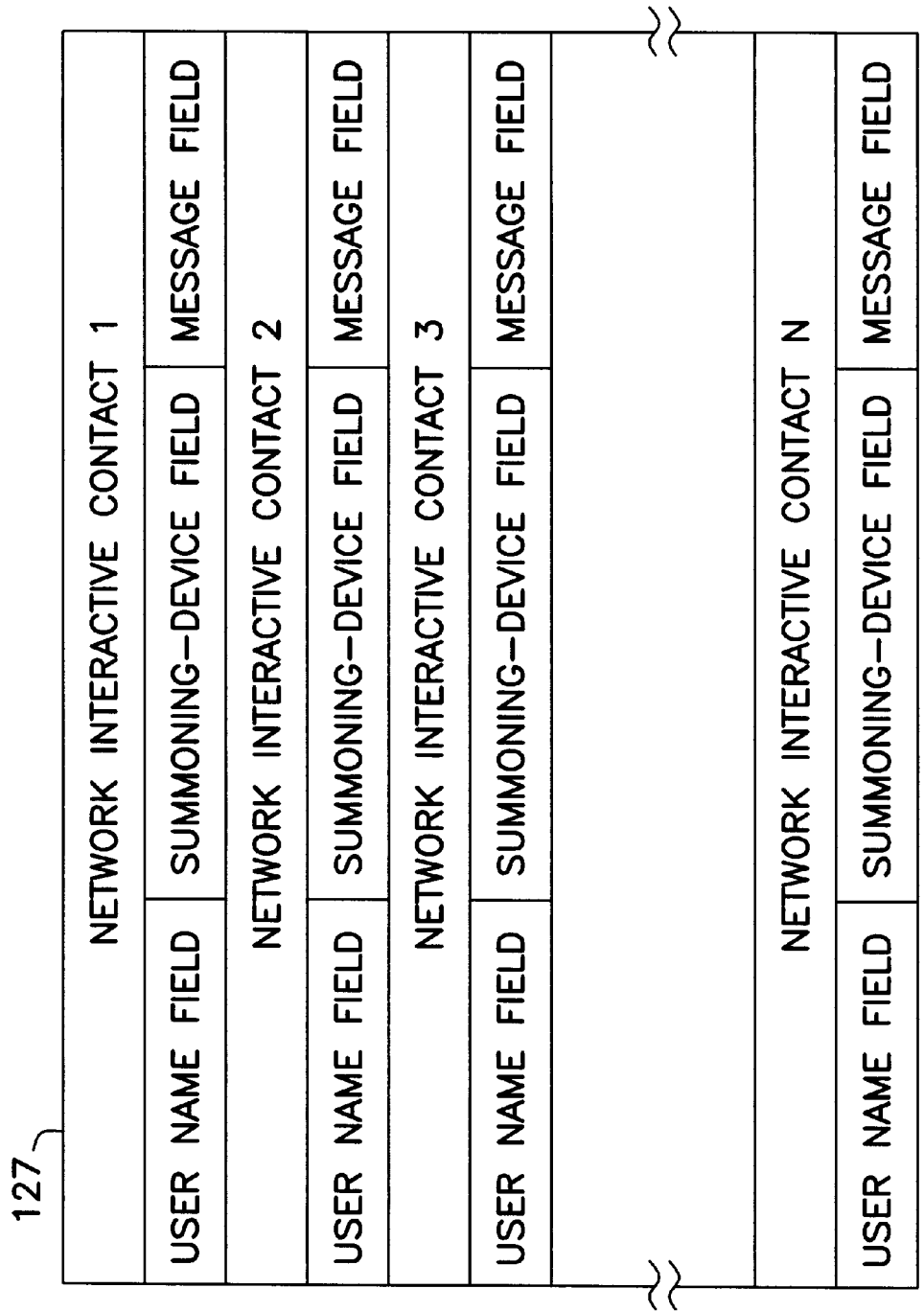
FIG. 3 is a table illustrating a data structure for a user database.

The following detailed description, which references and incorporates FIGS. 1–3, describes and illustrates specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

FIG. 1 shows a diagram of an exemplary communications system 10 incorporating a system, method, and software for on-line computer systems to communicate with off-line computer users, for example, to request off-line users to come on-line for conversations, games, or other online interactivity. To this end, communications system 10 includes a plurality of representative computers systems 12a, 12b, 12c interconnected or potentially interconnected via respective communications links 14a, 14b, and 14c to a generic computer network 16. Link 14a, shown as a solid line, represents an active communications link, whereas links 14b and 14c, shown as broken lines, represent inactive communications links. In other words, system 12a is online and systems 12b and 12c are offline, at least with respect to network 16. In various embodiments, network 16 is a wide-area network, such as the Internet or the World Wide Web, a local-area network, or an intranet.

Communications system 10 further includes a paging server 18 which links computer network 16 to paging network 20. Paging network 20 communicates, according to conventional paging technology, with pagers 22a, 22b, and 22c, which are associated with respective computer systems 12a, 12b, and 12c. In various embodiments, this association stems from attachment or integration of the pagers into the respective computer systems or from physical or logical association of the pagers with one or more users of these respective computer systems. The pagers, or portable selective call receivers, in some embodiments, also include a transmission capability.

Computer systems 12a, 12b, and 12c, in the exemplary embodiment, are similarly equipped personal computer systems, such as the G6 personal computer manufactured by Gateway 2000 of North Sioux City, S. Dak. (In other embodiments, the computers systems may differ from each other in form and capabilities. For example, in some embodiments, one or more of the systems is a portable system, such as the Solo™ 9100 XL portable computer system from Gateway 2000, Inc.) Among the most pertinent features of systems 12a, 12b, and 12c are respective processors 121a, 121b, and 121c, respective network communications devices 122a–122c, and respective data-storage device 123a–123c. In the exemplary embodiment, the processors are Intel Pentium II processors; the network communications devices are 56-Kilobyte-per-second modems; and the storage devices include respective hard drives. However, other embodiments of the invention, use other types of processors, network communications devices, and data storage devices. For example, depending on the particular embodiment, the data storage device includes one or more of the following: a read-only memory (ROM), a random-access-memory (RAM), an electrically-erasable and programmable-read-only memory (EEPROM), an optical disk, or a floppy disk.

Additionally, systems 12a, 12b, and 12c include respective display devices 124a, 124b, and 124c, and respective user-interface devices 125a, 125b, and 125c. Display devices 124 include a color monitor and virtual-reality goggles, and user-interface devices 125 include a keyboard, mouse, joystick, microphone, videocamera, body-field sensors, and virtual-reality apparel, such as gloves, headbands, bodysuits, etc.

System 12a, unlike systems 12b and 12c, also includes offline-user-summoning software 126 and an associated user-summoning database 127. (As used herein, the term "database" encompasses any physical or logical collection of machine-readable data.) However, in other embodiments, one or both of systems 12b and 12c also include software 126 and similar databases 127. In the exemplary embodiment, software 126 and database 127 are stored in data-storage device 123a.

In general, offline-user-summoning software 126 responds to an unsuccessful attempt to interactively engage or communicate with a target computer system or computer user, such as one or both of computer systems 12b and 12c, via network 16. The attempt may be unsuccessful for any number of reasons; however, for purposes of teaching the invention, one may assume that neither system 12b nor system 12c has an active link to network 16 as FIG. 1 indicates. However, in other embodiments, one or both of systems 12b and 12c may be filtering out or ignoring "calls" originating from system 12a, irrespective of their online status. In any event, after determining or sensing that no interactive link has been established, software 126 causes processor 121a to access database 127 and to send a message concerning the failed interaction to an alternative communications device, such as pager 22b or 22c or other passive communications device, which is associated with system 12b or 12c.

More specifically, offline-user-summoning software 126 causes its host computer system, for example system 12a, to operate according to the exemplary method illustrated in FIG. 2. The exemplary method begins at step 50, assuming installation of software 126 and creation of a specific version of database 127. In step 50, processor 121 determines that a system user has tried unsuccessfully to initiate an interactive session with a target computer system identified by a name, network address, or other identifying information. In the exemplary embodiment, the target computer system has a conventional Internet address, which conforms to Uniform-Resource-Locator (URL) standards.

In step 52, the processor, having determined that there was an unsuccessful attempt to initiate an interactive session, searches database 127 for the name of the target computer system or user. FIG. 3 shows an exemplary structure for database 127, which includes a number of interactive-contact records, with each record including a username field, a summoning-device field, and a message field. The username field includes a user name or alias; the summoning-device field includes a pager number, an e-mail address, voice telephone number, and/or fax number; and the message field includes a text or numeric message. In other embodiments, each record further includes a network-address field which identifies a primary network address, a group identification field which identifies one or more groups to which the username belongs, and an interaction-type field which identifies a type of network interactivity, such as conversation, multi-player game, videoconference, virtual-reality session, and so forth.

When the processor finds a match, that is, at least one name that corresponds identically or contextually to the target name, the processor accesses the summoning-device field associated with that username. In one embodiment, this field includes a pager number, or other communications-device identifier.

Although the exemplary embodiment assumes only one target system or user, other embodiments allow searching for two or more target names, which might be a subset of a target user group. Thus, for example, if a user attempts to initiate an interactive game with a target group of users (or computer systems), with some of the target group being available and others unavailable, one embodiment of the invention will attempt to contact the unavailable users while the other users commence interaction.

In step 54, after having found a match to the target name, system 12a attempts to send a message to the one or more alternate communications devices identified in the summoning-device field. In the exemplary embodiment, this entails communicating with pager 22b or 22c through network 16, paging server 18, and paging network 20. More specifically, processor 121a e-mails the pager number and a message through communications device 122a and network 16 to an Internet paging service, such as server 18, and the paging service transmits the message through paging network 20 to the corresponding pagers. (U.S. Pat. 5,487,100 to Kane, which is entitled Electronic Mail Message Delivery System and incorporated herein by reference, discloses details of one technique for achieving this end.) However, other embodiments directly call the pager number, providing it with the message. The exemplary message is a predetermined message identifying the URL, or alias, of system 12a with text indicating that an Internet link is desired. However, other embodiments provide a message that also identifies the type of network interaction desired by the online user and/or prompt the user to create a message.

In still other embodiments, the software includes instructions for causing the processor to send an e-mail message and/or facsimile to a respective address and facsimile machine associated with the computer system, in addition to-sending the pager message. Still other embodiments include sending an audio file message or establishing a voice telephone link with a speech-to-text interface that transcribes a voice message for use as text in an e-mail. Thus, these embodiments provide additional opportunities for reaching the unavailable user.

The system and method of the invention are adaptable to a wide range of applications. For example, one embodiment of the invention operates in the context of an online customer service center, wherein a customer can seek interactive on-line services from a customer-service provider who at times becomes temporarily unavailable. Thus, when the provider is unavailable, this embodiment attempts to contact the customer-service provider via a pager associated with the provider. Other interactive on-line services suitable for such an arrangement include, for example, non-emergency medical services, stock brokerage services, psychic hotline services, virtual-experience services, etc.

Conclusion

The present invention provides a convenient system, method, and software for summoning or notifying offline computer users that they are wanted online for interactive communications. In the exemplary embodiment, the invention responds to a failed attempt to interactively communicate with a computer system or computer user by searching a database for alternative communications device, such as a pager, associated with the system or user and then sends a message to the system or user via the alternative device, saving time and effort in notifying the offline user.

The embodiments described above are intended only to illustrate and teach one or more ways of practicing or implementing the present invention, not to restrict its breadth or scope. The scope of the invention, which encompasses all ways of practicing or implementing the invention, is defined only by the following claims and their equivalents.

What is claimed is:

1. A method of operating a first computerized system having a first network communications device, the method comprising:

operating the first computerized system to try to initiate communications between the first network communications device and a network communications device associated with a second computerized system; and after failing to initiate communications between the first and second network communications devices, operating the first computerized system to communicate a message to a second communications device associated with the second computerized system.

2. The method of claim 1:

wherein trying to communicate the message includes searching a database for information identifying the second computerized system and the second communications device;

wherein the first and second network communications device include respective first and second modems and the second communications device includes a pager; and wherein trying to communicate the message to the second communications device associated with the second computerized system includes transmitting information identifying the second communications device to a paging service.

3. The method of claim 1 wherein the second communications device is associated with a user who is associated with the second computerized system.

4. The method of claim 1 wherein the message indicates an online multi-player gaming opportunity or an online virtual-reality opportunity.

5. A method of operating a first computerized system having a first modem, the method comprising:

operating the first computerized system to try to initiate communications between the first modem and a second modem coupled to a second computerized system; and after failing to initiate communications between the first and second modems, operating the first computerized system to try to communicate a message via the first modem to a pager associated with the second computerized system.

6. The method of claim 5, wherein trying to communicate a message via the first modem to the pager includes searching a database for information identifying the second computerized system and a number associated with the pager.

7. The method of claim 5, wherein trying to communicate a message via the first modem to the pager associated with the second computerized system includes transmitting information identifying the pager to a paging service.

8. The method of claim 5, wherein the second communications device is associated with a user who is associated with the second computerized system.

9. The method of claim 5, wherein the message includes information identifying at least one of the following: a user associated with the first computerized system, the first computerized system, and a type of interaction.

10. A method of operating a first computerized system having a first modem, the method comprising:

operating the first computerized system to try to initiate communications between the first modem and a second modem coupled to a second computerized system;

after trying unsuccessfully to initiate communications, searching a database for information identifying a second computerized system and a number associated with a pager that is associated with a user of the second computerized system; and operating the first computerized system to try to communicate a message via the first modem to the pager associated with the second computerized system, including transmitting information identifying the pager to a paging service.

11. The method of claim 10, wherein the message includes information identifying at least one of a user of the first computerized system, the first computerized system, and a type of interactive communications.

12. A computerized system comprising:

a processor;

a network communications device coupled to the processor for communicating with one or more other computerized systems; and a computer-readable storage medium which comprises instructions for:

operating the computerized system to sense a failure to establish communications between the first network communications device and a second network communications device associated with a second computerized system; and operating the computerized system to try to communicate a message to a second communications device associated with the second computerized system, after sensing the failure.

13. The computerized system of claim 12:

wherein the message indicates an online multi-player gaming opportunity or an online virtual-reality opportunity; and wherein the computer-readable storage medium further includes instructions for searching a database for access information associated with the second communications device, before trying to communicate the message to the second communications device.

14. A machine-readable medium comprising machine-executable instructions for:

operating a computer system to sense a failure to establish communications between a network communications device within the computer system and a first network communications device associated with another computer system; and operating the computer system to try to communicate a message based on the failure to a second communications device associated with the other computer system, after sensing the failure.

15. The machine-readable medium of claim 14 further including machine-executable instructions for:

searching a database for access information associated with the second communications device, before trying to communicate the message to the second communications device associated with the computerized system.

16. The method of claim 10 wherein the message indicates an online multi-player gaming opportunity. a video-conferencing opportunity, or an online virtual-reality opportunity.

* * * * *